United States Patent [19]

Liu et al.

[11] 4,242,648
[45] Dec. 30, 1980

[54] HIGH POWER ELECTRODE AND FEEDTHROUGH ASSEMBLY FOR HIGH TEMPERATURE LASERS

[75] Inventors: Chi-sheng Liu, Monroeville; Donald W. Feldman, Pittsburgh; Roy K. Williams, Murrysville Borough; Lelland A. Weaver, Pittsburgh, all of Pa.

[73] Assignee: Westinghouse Electric Corp., Pittsburgh, Pa.

[21] Appl. No.: 974,579

[22] Filed: Dec. 29, 1978

[51] Int. Cl.³ .............................................. H01S 3/02
[52] U.S. Cl. .............................. 331/94.5 D; 313/219; 313/331
[58] Field of Search ............... 331/94.5 D, 94.5 G, 331/94.5 PE, 94.5 T; 313/219, 331, 281, 44

[56] References Cited

U.S. PATENT DOCUMENTS

| | | | |
|---|---|---|---|
| 3,609,582 | 9/1971 | Smets et al. | 331/94.5 D |
| 3,777,282 | 12/1973 | Richards | 331/94.5 D |
| 3,789,310 | 1/1974 | Mancebo | 331/94.5 D |
| 4,032,863 | 6/1977 | Altman et al. | 331/94.5 D |

*Primary Examiner*—James W. Davie
*Attorney, Agent, or Firm*—M. P. Lynch

[57] ABSTRACT

A double sealed technique in an evacuated quartz jacket produces an electrical feedthrough assembly suitable for use in sealed-off, pulse, longitudinal discharge lasers compatible with operating temperatures of up to 1100° C. without oxidation and with a minimum of circuit inductance.

7 Claims, 1 Drawing Figure

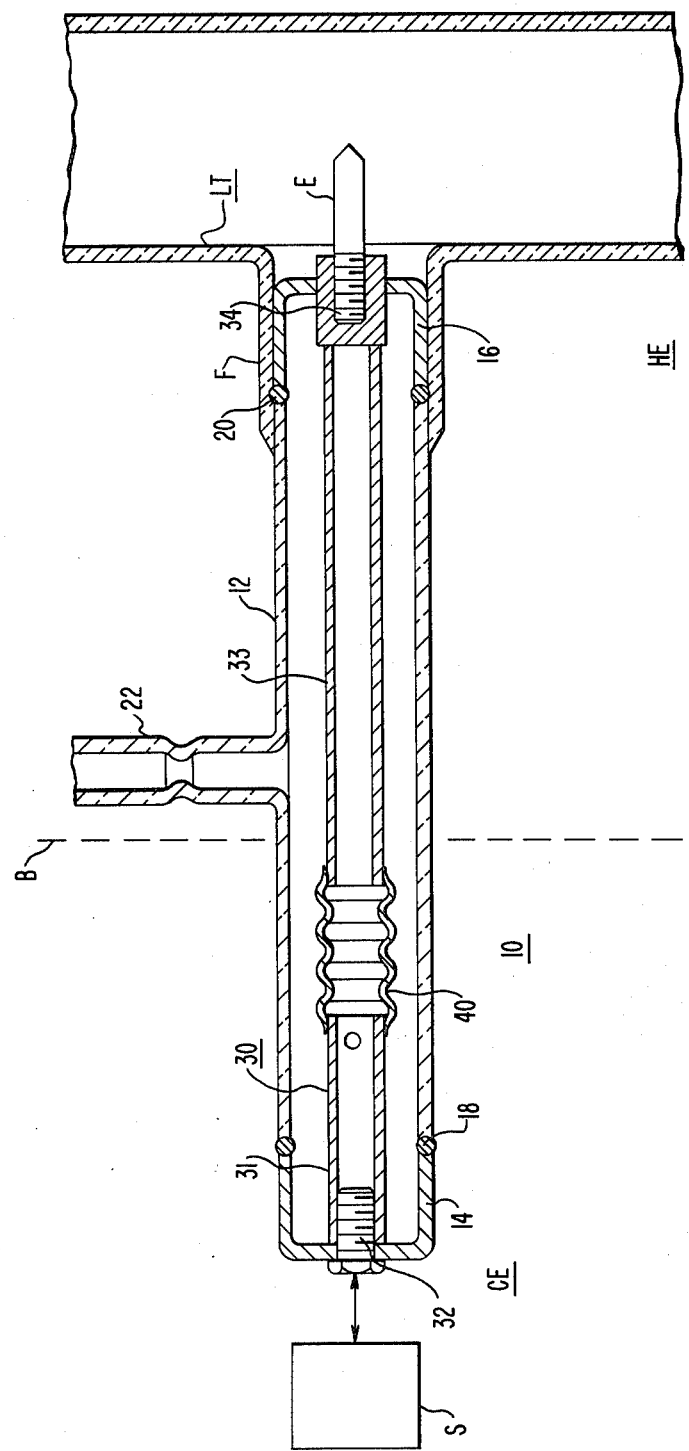

4,242,648

HIGH POWER ELECTRODE AND FEEDTHROUGH ASSEMBLY FOR HIGH TEMPERATURE LASERS

GOVERNMENT CONTRACT

This invention resulted from work performed under U.S. Navy Contract N00014-74-C-0445.

BACKGROUND OF THE INVENTION

High temperature lasers such as the lead vapor and copper halide systems must operate as a sealed-off unit to maintain thermodynamic and thermochemical equilibrium conditions within the laser tubes. Under these circumstances the metal (halide) vapor pressure is controlled by the cold spot temperature. In addition, the chemical decomposition of the halide species is reversible, and long-lived operation of the laser tube can be realized. This requirement means that the entire inner surface of the laser tube must operate near the temperature required for adequate vapor pressure, which is 400°–700° C. for copper halides and approximately 1100° C. for lead. Thus electrodes and electrical feedthroughs must be designed to withstand these high temperatures, and must also be capable of withstanding chemical attack at elevated temperatures by the laser tube contents. Even when the laser tube is not sealed off, the same electrode/feedthrough assemblies are required to prevent excessive condensation of the laser material near the electrical feedthrough.

SUMMARY OF THE INVENTION

The invention described herein is a unique double-feedthrough and electrode assembly which permits the desired all-hot, sealed-off laser tube operation with metal/metal halide laser materials. The innermost seal, to which the electrode is attached, can operate at temperatures up to the softening point of quartz (1200° C.), and is protected from oxidation by a quartz vacuum jacket which encloses the seal. A second seal, remote from the electrode, operates near room temperature. The seals are designed to minimize stresses due to the differences in thermal expansion coefficients between quartz and molybdenum, and the entire assembly is designed to minimize circuit inductance.

BRIEF DESCRIPTION OF THE DRAWING

The invention will become more readily apparent from the following exemplary description in connection with the accompanying section schematic illustration of a feedthrough and electrode assembly incorporating the inventive concept.

DESCRIPTION OF THE PREFERRED EMBODIMENT

Referring to the drawing there is a sectioned illustration of an electrode and feedthrough assembly 10 typically illustrated in combination with a quartz laser tube LT.

The assembly 10 includes a tubular quartz housing 12 having molybdenum cup members 14 and 16 secured to either end via a suitable quartz to molybdenum mechanical press seals 18 and 20 respectively. The cup seals 18 and 20 minimize the stresses induced in the seal by differences in thermal expansion coefficients.

In the embodiment illustrated, the end of the assembly 10 consisting of molybdenum cup member 16 is the hot end HE. The cup member 16 is sealed within a quartz flange F of the laser tube LT and is located within the boundary B of a laser heating means (not shown) or a heat shield in the event the laser is self-heated. The cup member 16 and the seal 20 are thus subjected to the elevated operating temperatures of the laser tube LT. The laser tube LT must operate near the temperature required for adequate vapor pressure for lead vapor and copper halide systems, which is between 400°–700° C. for copper halides and approximately 1100° C. for lead. Although the seals 18 and 20 can withstand temperatures up to the softening point of quartz, i.e. 1200° C., the seals 18 and 20 would oxidize and crack if exposed to air at the operating temperatures of the metal halide systems. Thus, in order to protect the seal 20 located in the hot end HE of the assembly 10, the volume V within the quartz tube 12 is evacuated through a side tube 22. After evacuation, the side tube 22 is sealed closed. As an alternative to evacuating the internal volume V of the tube 12, the tube 12 can be filled with an inert gas, such as nitrogen or argon, to prevent oxidation at the seal 20.

Electrical current from electrical excitation source S to the electrode E which is positioned within the laser tube LT is conducted along the length of the assembly 10 by a tubular molybdenum rod 30. The molybdenum rod 30 is secured to the molybdenum cup 14 at the cold end CE via a threaded stud 32 which provides electrical connection to the electrical excitation source S. The opposite end of the molybdenum rod 30 is secured to the molybdenum cup 16 in the hot end HE via a threaded electrode support member 34 which accommodates the laser electrode E. The threaded stud 32 is welded or brazed to the base of the cup 14 while the threaded adapter 34 is furnaced brazed, or electron beam welded, to the base of the cup 16 to form a vacuum tight seal. The threaded members 32 and 34 are made of molybdenum. It has been experimentally determined that copper or gold based braze materials are often attacked chemically by dissociated halogens at elevated temperatures when copper halides are employed as the laser starting material. The free halogens transport the copper or gold braze materials as halides into other sections of the quartz tube 12 causing the braze securing the adapter 34 to the cup 16 to deteriorate. Such a problem would not exist when pure lead is employed as a laser material, since no halides are present and the braze is mechanically stable at the lower range of lead laser operating temperatures. However, to avoid potential problems in metal/metal halide lasers, a superior approach is to fabricate all metal parts exposed to the laser medium from molybdenum, and join them together as required using an electron beam weld. This technique has been employed successfully and provides leak-tight, chemically and mechanically stable joints capable of surviving for extended periods of time under exposure to metal and metal halide discharges at elevated temperatures.

In order to compensate for differences in thermal expansion coefficients, a stainless steel bellows 40 is substituted for a portion of the molybdenum rod member 30 and functions to mechanically couple elements 31 and 33 of the rod member 30. The bellows 40 allows for thermal expansion and contraction of the molybdenum rod member 30 with respect to the quartz tube 12. The bellows is furnace brazed to the elements 31 and 32 of the molybdenum rod member 30. The result is a double feedthrough assembly with a protective, evacuated quartz jacket, where differences in thermal expansion have been accommodated by the expansion bellows 40.

A unique feature of the assembly 10 is that the high peak electrical currents are carried along the surface of the molybdenum rod member 30 which connects the molybdenum end cups 14 and 16. This is a low inductance configuration, and minimizes the rf loss and subsequent electrical heating of the assembly 10 while preserving high peak current and rapid current rise time capabilities. In addition, these high peak currents do not pass through the seals 18 and 20, thereby avoiding possible damage to these seals by electrical heating. Thus the assembly 10 is completely compatible with the high peak current, high average power, rapid current rise time and high pulse rate frequency requirements of metal and metal halide lasers. The assembly 10 has been successfully employed under actual high power laser conditions.

What we claim is:

1. In a high temperature laser, a feed-through assembly comprising:

an open-ended elongated tubular quartz envelope, a first and second molybdenum assembly sealed to either end of said quartz envelope to seal off the enclosed volume of said quartz envelope, said first molybdenum assembly including an electrical contact means for connection to an electrical excitation source, said second molybdenum assembly including an electrode adapter means and a tubular electrical conductor means positioned within said quartz envelope and connected between said electrical contact means of said first molybdenum assembly and said electrode adapter means of said second molybdenum assembly.

2. An assembly as claimed in claim 1 wherein said tubular electrical conductor means is molybdenum.

3. An assembly as claimed in claim 1 wherein the sealed-off enclosed volume of said quartz envelope is evacuated.

4. An assembly as claimed in claim 1 further including an inert gas within the sealed-off enclosed volume of said quartz envelope.

5. An assembly as claimed in claim 1 wherein quartz to molybdenum mechanical press seals seal the first and second molybdenum assemblies to said quartz envelope.

6. An assembly as claimed in claim 1 wherein tubular electrical conductor means consists of tubular molybdenum rod and a tubular bellows element to provide thermal expansion compensation.

7. An assembly as claimed in claim 1 wherein said first and second molybdenum assemblies are cup-like members, said electrical contact means being positioned at the center of the base of the first molybdenum cup-like member, said electrode adapter means being positioned at the center of the base of the second molybdenum cup-like member, said tubular electrical conductor means being a molybdenum rod concentrically positioned within said quartz envelope.

* * * * *